United States Patent
Nicholes

(10) Patent No.: US 9,477,848 B2
(45) Date of Patent: Oct. 25, 2016

(54) SYSTEM AND METHOD FOR MANAGING AND DIAGNOSING A COMPUTING DEVICE EQUIPPED WITH UNIFIED EXTENSIBLE FIRMWARE INTERFACE (UEFI)-COMPLIANT FIRMWARE

(71) Applicant: Insyde Software Corp., Taipei (TW)

(72) Inventor: Martin O. Nicholes, Rocklin, CA (US)

(73) Assignee: Insyde Software Corp., Taipei (TW)

( * ) Notice: Subject to any disclaimer, the term of this patent is extended or adjusted under 35 U.S.C. 154(b) by 0 days.

(21) Appl. No.: 14/204,413

(22) Filed: Mar. 11, 2014

(65) Prior Publication Data

US 2014/0281577 A1  Sep. 18, 2014

Related U.S. Application Data

(60) Provisional application No. 61/790,818, filed on Mar. 15, 2013.

(51) Int. Cl.
*G06F 21/71* (2013.01)
*G06F 21/85* (2013.01)

(52) U.S. Cl.
CPC ............. *G06F 21/71* (2013.01); *G06F 21/85* (2013.01)

(58) Field of Classification Search
CPC .......... G06F 21/71; G06F 21/85; G06F 2221/2107; G06F 9/54; G06F 9/541–9/545; G06F 9/455; G06F 9/4411; G06F 21/572; G06F 21/577; G06F 11/2205; G06F 11/2247; G06F 9/4401; G06F 11/2284
USPC ......................................................... 713/189
See application file for complete search history.

(56) References Cited

U.S. PATENT DOCUMENTS

| | | | |
|---|---|---|---|
| 7,512,956 B1 * | 3/2009 | Nicholes ................ | G06F 9/455 709/250 |
| 7,967,193 B1 * | 6/2011 | McGinley et al. ........... | 235/379 |
| 8,924,737 B2 * | 12/2014 | Thom et al. .................. | 713/187 |
| 2003/0204710 A1 * | 10/2003 | Culter ................... | G06F 9/4401 713/1 |
| 2004/0088531 A1 * | 5/2004 | Rothman ........................ | 713/1 |
| 2004/0158711 A1 * | 8/2004 | Zimmer ....................... | 713/165 |
| 2004/0177243 A1 * | 9/2004 | Worley, Jr. ...................... | 713/2 |
| 2005/0005067 A1 | 1/2005 | Culter et al. | |
| 2005/0060526 A1 | 3/2005 | Rothman et al. | |
| 2005/0149924 A1 * | 7/2005 | Komarla et al. .............. | 717/176 |
| 2006/0123223 A1 | 6/2006 | Mayfield et al. | |
| 2006/0272020 A1 * | 11/2006 | Gardner ......................... | 726/23 |

(Continued)

FOREIGN PATENT DOCUMENTS

WO     2012/139026 A2     10/2012

OTHER PUBLICATIONS

International Search Report and Written Opinion for Application No. PCT/US2014/023360, 8 pages, dated Aug. 14, 2014.

*Primary Examiner* — Catherine Thiaw
(74) *Attorney, Agent, or Firm* — McCarter & English, LLP; John S. Curran

(57) ABSTRACT

A computing device equipped with UEFI-compliant firmware is provided with added functionality via an extended firmware interface. The variable interface is called with special parameters, which redirect handling of firmware service calls. Embodiments use authenticated variables to provide security properties to the special interface, use the firmware interface to provide access to diagnostics, and use the firmware interface to provide access to system management.

16 Claims, 5 Drawing Sheets

(56) References Cited

U.S. PATENT DOCUMENTS

| | | | |
|---|---|---|---|
| 2007/0033322 A1* | 2/2007 | Zimmer | G06F 9/4401 711/103 |
| 2008/0028200 A1* | 1/2008 | Polyudov | 713/2 |
| 2008/0196043 A1* | 8/2008 | Feinleib et al. | 719/319 |
| 2009/0300370 A1* | 12/2009 | Yao et al. | 713/193 |
| 2011/0078293 A1* | 3/2011 | Phung | G06F 9/44505 709/222 |
| 2011/0271268 A1 | 11/2011 | Dang | |
| 2012/0084552 A1* | 4/2012 | Sakthikumar et al. | 713/100 |
| 2012/0254831 A1* | 10/2012 | Mortensen | G06F 9/4401 717/107 |
| 2013/0061242 A1* | 3/2013 | Lewis | 719/313 |
| 2013/0232287 A1* | 9/2013 | Chen | G06F 11/2284 710/260 |
| 2013/0246779 A1* | 9/2013 | Wang | G06F 21/572 713/2 |
| 2013/0291070 A1* | 10/2013 | Triantafillou et al. | 726/4 |

* cited by examiner

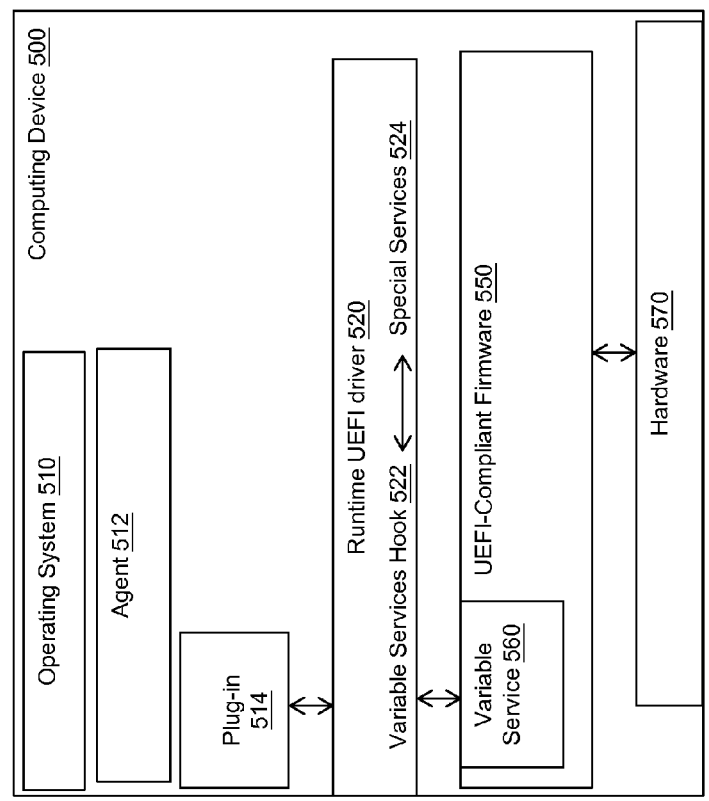

SYSTEM AND METHOD FOR MANAGING AND DIAGNOSING A COMPUTING DEVICE EQUIPPED WITH UNIFIED EXTENSIBLE FIRMWARE INTERFACE (UEFI)-COMPLIANT FIRMWARE

RELATED APPLICATION

This application claims the benefit of U.S. Provisional Patent Application No. 61/790,818, entitled "System and Method for Managing and Diagnosing a Unified Extensible Firmware Interface (UEFI)-Compliant Computing Device", filed on Mar. 15, 2013, the contents of which are incorporated herein by reference in their entirety.

BACKGROUND

Computing devices are initialized by firmware included within the device and this firmware provides a range of software services which facilitate the boot of the operating system (OS) as well as providing a subset of these services that continue to be available after the operating system has booted. Firmware is software supplied by a system manufacturer and written onto Read-Only Memory (ROM) modules including, but not limited to, ROM, PROM, EPROM, EEPROM, and Flash memory (collectively referred to hereafter as "ROM"). Among other roles, the firmware is responsible for operation of the computing device until a boot process can be run which loads an operating system for the computing device into memory. Once loaded, the operating system is in charge of normal operation of the computing device although the provision of certain services after loading of the operating system may require a transition of control from the operating system back to the firmware for security and other reasons.

Unified Extensible Firmware Interface (UEFI) is a specification created by a non-profit industry body detailing a programming interface between the Operating System and the included firmware of a computing device such as, but not limited to, a Personal Computer (PC). The UEFI specification describes a set of tools by which a computing device can move in an organized fashion from the initial 'power-applied' state to 'fully operational.' The specification tells the desired result but deliberately does not specify the internal firmware implementation. The UEFI firmware specification replaces earlier OS/firmware interfaces previously used by the industry and commonly known as legacy BIOS.

When implemented in a computing device, the machine codes for UEFI firmware and all permanent data used by the firmware reside in Read Only Memory (ROM). In many cases the ROM is an Electrically Erasable silicon device known as a flash ROM. Flash ROM has the characteristic that it can be erased by electrical command and individual elements may then be written and the device will retain the data indefinitely. When power is first applied to the computing device, the system executes a process called reset which clears the state to a known condition and begins execution of the firmware. The firmware is read from the flash ROM or other ROM in the computing device.

The operation of the firmware is controlled by updatable storage within flash ROM or other device. This updatable storage for options and data is typically organized according to UEFI specification chapters pertaining to UEFI Variables. Variables in the UEFI specification are defined as key/value pairs that include identifying variable name information plus attributes (a key) and one or more associated data bytes (the value). The variable name is composed of two parts, firstly a computer encoded string and secondly a 128-bit Globally Unique Identifier of GUID. The GUID is used to partition the variable namespace so that duplicate uses of the same name string for different purposes is statistically unlikely. Among their uses, the variables store data that is passed between the firmware environment and agents/applications executing in the operating system environment. The variables may be accessed from the operating system environment through a UEFI specification-defined interface using firmware service calls defined in the UEFI specification as GetVariable and SetVariable functions which respectively retrieve a variable value or set the value of a specified variable stored in firmware. GetVariable and SetVariable are used in the firmware phase of system boot and additionally the use of the GetVariable and SetVariable calls are supported by many of today's operating systems after the operating system has booted. A subset of the UEFI variables are created with additional protection attributes and are known as Authenticated Variables. These Authenticated Variables in a computing device equipped with UEFI-compliant firmware are intended to be protected from software modification except by authorized agents holding an update signing key.

BRIEF SUMMARY

Embodiments of the present invention provide to a computing device equipped with Unified Extensible Firmware Interface (UEFI)-compliant firmware added functionality via an extension of the defined firmware interface used for access of UEFI variables. A system expressing the extended UEFI variable interface may be called with unique parameters which are recognized by the firmware and allow special management or diagnostic functionality to be accessed. This approach allows new extensions to standard firmware functionality to be accessible through existing firmware interfaces without requiring changes to the operating system code providing the Variable Access service. Embodiments may use authenticated variables to provide security properties to the special interface, use the firmware interface to provide access to diagnostics, and to use the firmware interface to provide access to system management.

In an embodiment, a computer-implemented method for managing and diagnosing a computing device equipped with Unified Extensible Firmware Interface (UEFI)-compliant firmware includes receiving, via an extension to a standard UEFI-variable firmware interface, a firmware service call from a software agent executing in an operating system environment. The firmware service call includes an extended variable parameter. At least one of a command, a timestamp and a session ID in the firmware service call are received in encrypted form. The extended variable parameter is identified and the handling of the firmware service call is redirected based on the identification. At least one of the command, the timestamp and the session ID are decrypted using a key stored by the firmware, the decrypting authenticating the calling agent before the firmware service call is processed. The firmware service call is processed following the redirection and decrypting and a result of the processing is returned to the calling software agent. The returned result is used to perform at least one of a management or diagnostic function for the computing device.

In another embodiment, a computing device equipped with UEFI-compliant firmware includes read-only memory (ROM) holding the firmware and a memory holding an operating system. The computing device also includes a processor configured to execute instructions causing the computing device to receive, via an extension to a standard UEFI-variable firmware interface, a firmware service call from a software agent executing in an operating system environment. The firmware service call is made with an extended variable parameter. At least one of a command, a timestamp and a session ID in the firmware service call are received in encrypted form. The execution of the instructions further causes the computing device to identify the extended variable parameter and redirect the handling of the firmware service call based on the identification. At least one of the command, the timestamp and the session ID are decrypted using a key stored by the firmware, the decrypting authenticating the calling agent before the firmware service call is processed. The firmware service call is processed following redirection and decryption and a result of the processing is returned to the calling operating system module. The result is used to perform at least one of a management or diagnostic function for the computing device.

In an embodiment, a computer-implemented method for managing and diagnosing a computing device equipped with Unified Extensible Firmware Interface (UEFI)-compliant firmware includes receiving, via an extension to a standard UEFI-variable firmware interface, a firmware service call from a software agent executing in an operating system environment. The firmware service call includes an extended variable parameter. The extended variable parameter is identified and the handling of the firmware service call is redirected based on the identification. The firmware service call is processed following the redirection and a result of the processing is returned to the calling software agent. The returned result is used to perform at least one of a management or diagnostic function for the computing device.

BRIEF DESCRIPTION OF THE DRAWINGS

The accompanying drawings, which are incorporated in and constitute a part of this specification, illustrate one or more embodiments of the invention and, together with the description, help to explain the invention. In the drawings:

FIG. 5 depicts an exemplary alternative environment suitable for practicing an embodiment of the present invention employing a runtime UEFI driver.

DETAILED DESCRIPTION

Figure 1:
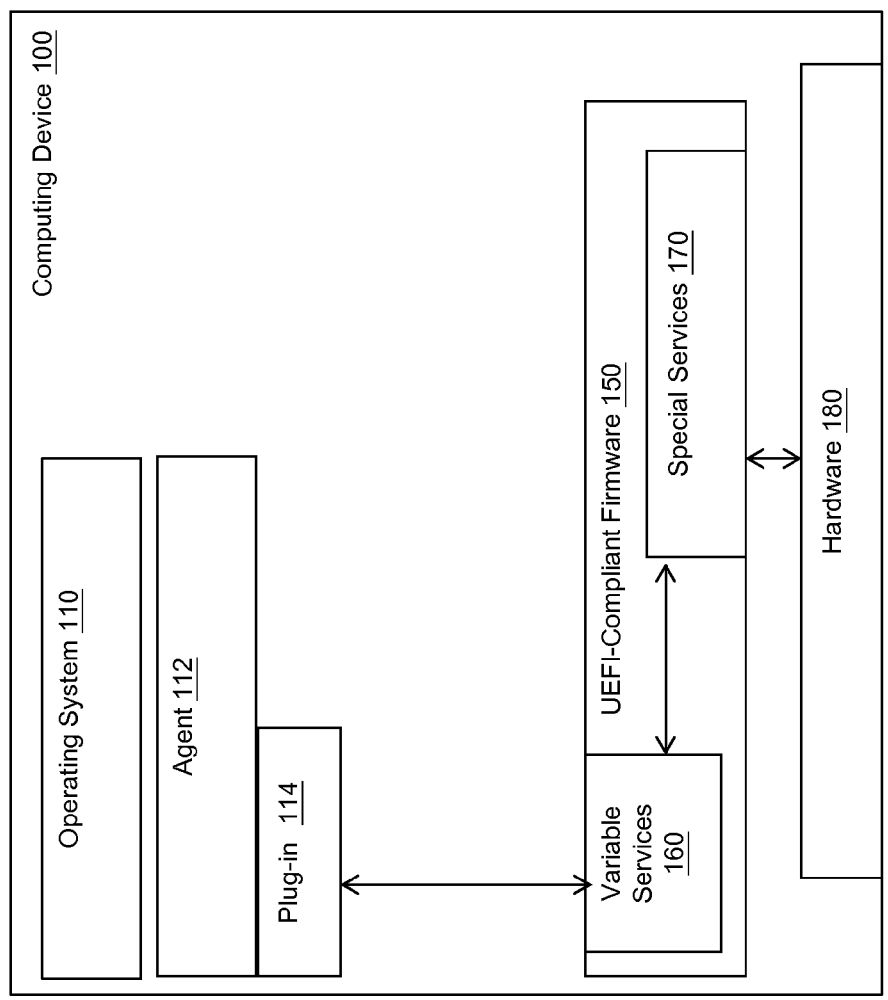
FIG. 1 depicts an exemplary environment suitable for practicing an embodiment of the present invention.

Embodiments of the present invention provide increased management and diagnostic capabilities to a computing device equipped with UEFI-compliant firmware without requiring operating system (OS) code changes. Through a firmware-based approach, management and diagnostic capabilities can be improved while allowing rapid changes to the firmware feature set that are made available to applications and other software agents executing in the OS environment. These capabilities are increased through the creation of an extended firmware variable interface on systems with UEFI-compliant firmware. Authenticated variables are used to provide security properties to the extended interface by authenticating callers before firmware service calls are processed.

In one embodiment, if a management application running in the operating system environment on the computing device requires low-level system information known to firmware, the management application may use the extensions to the standard GetVariable interface to request the information from special services in firmware. The information requested may be identified by a unique combination of parameter values normally passed to the GetVariable function including a unique Vendor GUID and unique Variable Name. A GUID may be constructed according to procedures intended to ensure that its value will be unique and that therefore there is a high probability that no other standard GetVariable call will accidentally use the GUID which identifies this extension. In another embodiment, a system management application that wants to change a setting at the firmware level may use the extended SetVariable interface to request firmware to change the setting. Similarly, in the area of diagnostics, a diagnostic application or other tool executing in the OS environment may require a special test to be performed by the computing device's firmware during the next reboot. The diagnostic tool may request that the firmware perform the test with a request made through the extended SetVariable interface of the present invention.

The standard defined UEFI variable services interface which is extended by embodiments of the present invention has been supported for several years on various operating systems and includes support for GetVariable and SetVariable firmware service calls. Embodiments thus provide a flexible mechanism for adding new functionality by creating an API spread across different variables. In the case of system management, the use of the variable interface is natural, as one main component of system management is reviewing and modifying system settings. No new hardware is required by the embodiments of the present invention which are able to provide increased functionality without requiring the use of a System Management Interrupt (SMI) to trigger a transition to System Management Mode (SMM).

Embodiments of the present invention use special parameters to defined UEFI firmware variable service calls including GetVariable and SetVariable to access system management and diagnostics. System management functions include but are not limited to: obtaining detailed inventory and/or platform information, updating firmware, changing firmware settings, and controlling boot of the platform. Diagnostic functions include, but are not limited to: running tests on the platform, querying for test results, querying for platform errors, and setting up tests to run on the next boot. The special parameters used in the firmware variable service calls may include a special GUID value so as to avoid conflict with the standard use of the variable interface. The firmware variable interface utilized by embodiments of the present invention is available during all phases of platform operation, including OS runtime. For example, under recent versions of Windows, the call SetFirmwareEnvironmentVariable( ) is available in the Windows API. In the same way, GetFirmwareEnvironmentVariable( ) is available to read a UEFI variable.

It should be appreciated that although the descriptions herein of illustrative embodiments of the present invention describe the use of GetVariable and SetVariable firmware variable service calls, other firmware variable service calls to the extended firmware interface described herein may also be utilized without departing from the scope of the present invention and so the exemplary description of the usage of the GetVariable and SetVariable calls is also applicable to other firmware variable service calls, such as UpdateCapsule.

FIG. 1 depicts an exemplary environment suitable for practicing an embodiment of the present invention. A computing device 100 equipped with UEFI-compliant firmware 150 runs an OS 110. In the OS environment a software agent, application or other executable process (collectively referred to hereafter as "agent" hereafter) 112 is running. An example of agent 112 is a management application although agent 112 could also be a diagnostic tool or some other executable code. In one embodiment, a plug-in module 114 may provide a translation between a platform-independent agent 112 and UEFI-compliant firmware 150. Agent 112, running in the operating system environment, may make a firmware service call, with or without the use of plug-in module 114, to UEFI-compliant firmware 150 using the extended variable firmware service interface exposed by a variable service module 160 provided by the UEFI-compliant firmware. The variable service module 160 identifies a specified parameter in the firmware service call. For example, the variable service module 160 may identify a special GUID passed in a VendorGuid parameter that is part of a GetVariable or SetVariable call. The identification triggers special handling of the call. Based on the identification, the variable service module 160 passes control of the handling of the firmware service call to alternative firmware code such as special service module 170 in the UEFI-compliant firmware 150. The special services module 170 provides special services, such as system management and diagnostics, based on a specified command included in the redirected service call. For example, in one embodiment, the command may be included in the data portion of the GetVariable or SetVariable service call. To provide instructions to the firmware the value data in the service call contains encoded information understood by the firmware such as a specific requested command, plus additional transaction identification such as a timestamp or session ID. Depending on the nature of the service call, the special services module 170 may retrieve information from, or send a command to, hardware 180. In one embodiment, since the UEFI variable service module provides an authenticated option, that authentication information can be used to verify the rights of the caller of the interface to access protected functions in the system before processing the service call. For example, the authentication might be a signed hash of the caller's executable.

The GetVariable service call defined in the UEFI specification uses a number of defined parameters. By specification, the GetVariable service call is defined as:

```
EFI_STATUS
    GetVariable (
    IN CHAR16 *VariableName,
    IN EFI_GUID *VendorGuid,
    OUT UINT32 *Attributes OPTIONAL,
    IN OUT UINTN *DataSize,
    OUT VOID *Data
    );
    EFI_STATUS
```

Conventionally, using this definition, an application or other software agent running in the operating system environment that wanted to retrieve a value of a particular firmware variable would make a call to the firmware using GetVariable and provide parameters that include the assigned name of the variable (VariableName), and a unique ID for the scope of the variable (VendorGuid). Other parameters provided by the caller would include the size of the return data buffer on input or the size of the data returned in output (DataSize) and the buffer to which the contents of the variable should be returned (Data). The parameters also might optionally include a memory location to return an attributes bitmask for the variable (Attributes).

Embodiments of the present invention may make use of this defined firmware interface. For example, a software agent executing in the OS environment may call GetVariable and provide a special unique defined GUID in the vendor GUID parameter. The special GUID acts as a flag to variable service module 160 and causes a redirection of the handling of the firmware services call by firmware code different from the code that would ordinarily handle the call. Additionally, the data field may be populated with a command to be used by the special services module 170 in processing the redirected firmware services call. For example, the command may be to read and return a value of a particular hardware setting needed for system management or diagnostics that would not otherwise be available to the OS-based agent.

As described above, in one embodiment, the use of the special GUID parameter in the firmware services call may only serve to trigger redirection of the handling of the firmware services call and the special service module may use a command in the data or other parameter field to process the firmware services call. In an alternative embodiment, the identification of the particular special GUID value may trigger not only the special handling of the call but also the nature of that special handling by a variable service module and/or special services modules configured to process the call based on the special GUID value (i.e. special GUID value A causes handling C and special GUID value B causes handling D).

Similarly to the GetVariable service call, the SetVariable service call defined in the UEFI specification uses a number of defined parameters. For example, the SetVariable service call may be represented as:

```
SetVariable (
    IN CHAR16 *VariableName,
    IN EFI_GUID *VendorGuid,
    IN UINT32 Attributes,
    IN UINTN DataSize,
    IN VOID *Data
    );
```

Conventionally, using this definition, an application or other software agent running in the operating system environment that wanted to set a value of a particular firmware variable would make a call to the firmware using SetVariable and provide parameters that include the name of the variable (VariableName), and a unique ID for the scope of the variable (VendorGuid). Other parameters provided by the caller would include the size of the data buffer (DataSize) and the buffer to which to deliver the updated contents of the variable (Data) and include a memory location to supply an attributes bitmask for the variable (Attributes).

Similarly to the use of GetVariable described above, embodiments of the present invention may make use of this defined firmware interface when calling the extended interface of the present invention from an agent executing in the OS environment. For example, the agent in the OS environment may provide a special GUID in the call instead of the vendor GUID. The special GUID acts as a flag to the variable service module 160 and causes a redirection of the handling of the firmware variable services call. Additionally, the data field may be populated with a command to be used by the special services module 170 in processing the call. For example, in one embodiment, if a system was running the Linux OS, and a system management software agent wanted to change a firmware setting, such as enabling PXE boot, the agent may make a UEFI SetVariable call, with the special GUID, as well pass in the correct command in the Data parameter. The variable service module 160 reacts to the identification of the special GUID by passing the command to the special services module 170. The special services module 170 modifies the firmware setting and then returns to the standard variable code. The variable code would return to the agent. If there was an error returned for the special SetVariable call, the agent may, in one embodiment, make a similar special call to retrieve more detailed error information. Other system management functions may be performed in a similar fashion.

In addition to management functions, the extended interface of the present invention may also be used to expand the diagnostic capabilities of a computing device. For example, in one embodiment, if a diagnostic application wanted to run a diagnostic test during the next boot, such as a memory test, the application may make a UEFI SetVariable call. The SetVariable call includes the special GUID in place of the vendor GUID parameter to trigger special handling, as well as the command the application wishes to be processed in the Data parameter (pseudo-code="set memory test to run next boot"). The variables service module 160 identifies the special GUID and passes the command to the special services module 170 that has the ability to handle diagnostic test settings. The special services module 170 may modify the diagnostic test setting as requested and then return to the standard variable code. The variable code then returns to the agent. In one embodiment, if there is an error returned for the special SetVariable call, the diagnostic application may make a similar special call to retrieve more detailed error information. Other diagnostic functions may be performed in a similar fashion.

Figure 2:
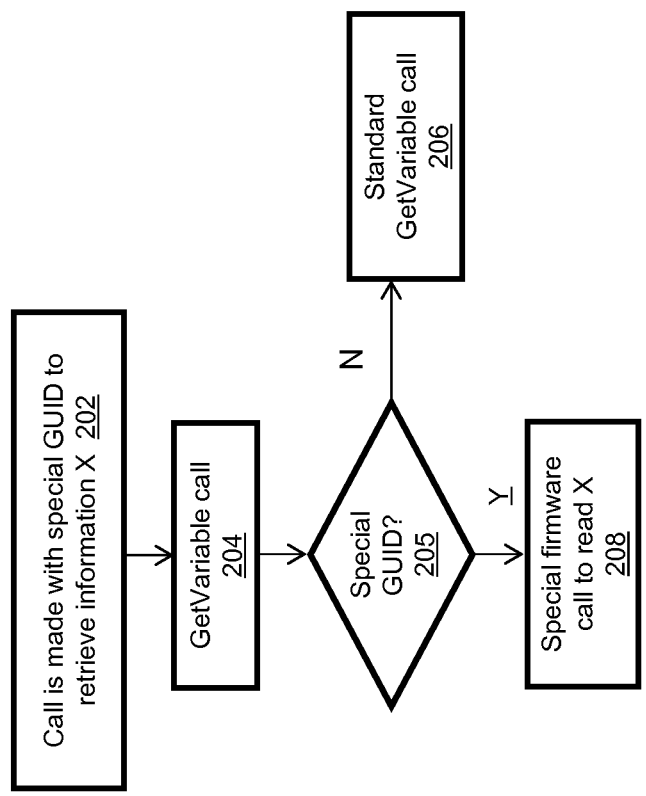
FIG. 2 depicts an exemplary sequence of steps executed by an embodiment of the present invention to utilize an extended UEFI variable interface.

FIG. 2 depicts an exemplary sequence of steps executed by an embodiment of the present invention to utilize an extended UEFI variable interface. The sequence begins with an agent in the OS environment making a firmware services call using an extended parameter (such as a special GUID) in order to retrieve desired information X (step 202). The call is made to the GetVariable interface exposed by the variable service module 160 of the UEFI-compliant firmware 150 (step 204). If the variable service module identifies the extended parameter, the special GUID (or other extended parameter) triggers a call to a special services firmware module to read and then return the value of information X requested by the service call (step 208). Ordinary firmware services not including the extended parameter may be handled normally by the variable service module (step 206)

Security of the special firmware interface is important. If no special care is taken, the only security on the special functions is that provided by the Operating System for the normal Variable API. Some special functions will require authentication information. Such authentication information could be passed in as part of the data during a SetVariable call. However, if special protection is required for a GetVariable call, passing of the authentication information is difficult as the caller does not send any data to GetVariable. To address this issue embodiments of the present invention may provide additional security to prevent unauthorized use of the extended firmware variable service interface of the present invention.

Figure 3:
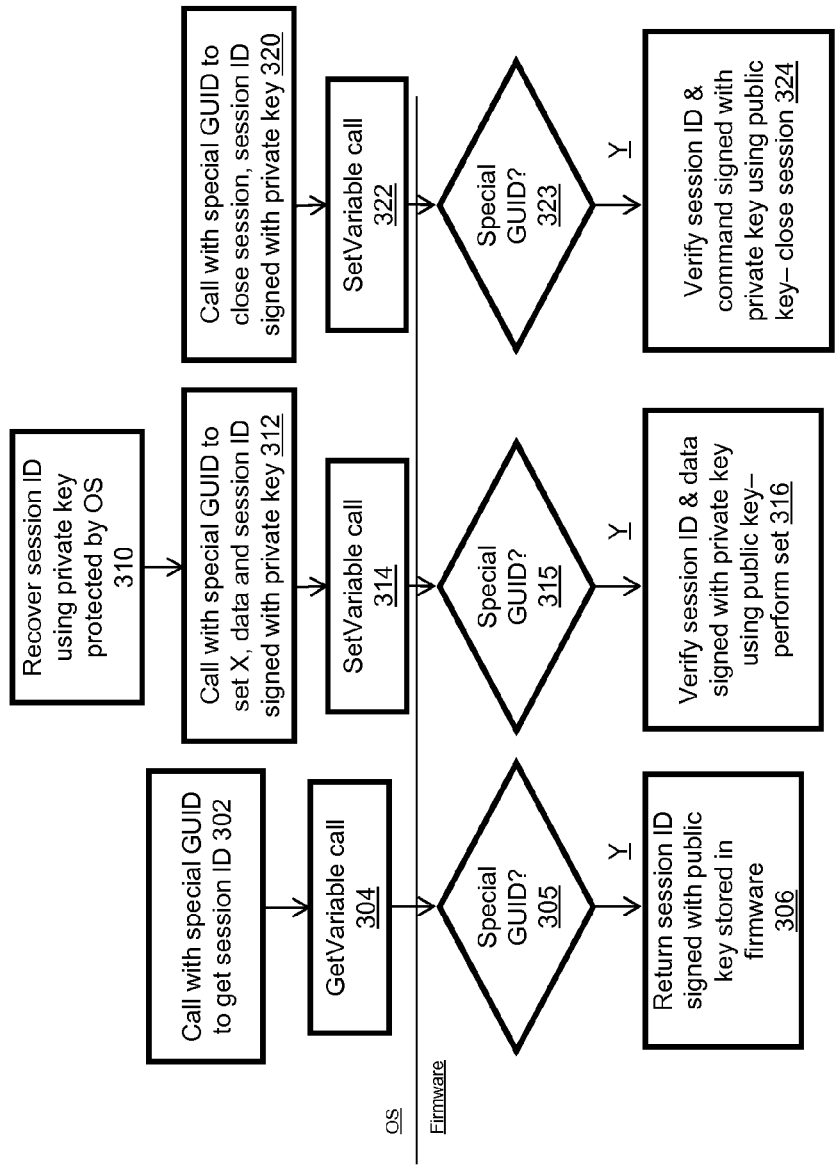
FIG. 3 depicts an exemplary sequence of steps executed by an embodiment of the present invention to perform an authenticated special firmware call.

FIG. 3 depicts an exemplary sequence of steps executed by an embodiment of the present invention to perform an authenticated special firmware call. In one embodiment, an agent running in the OS has created a special authenticated variable during platform deployment called, for example, "SystemManagementKey". The authenticated variable may be signed using a private key protected by the operating system which prevents other agents from making any modification to the authenticated variable. This protected variable contains data to be utilized for the authorization of extended functions using a technique known as public/private key cyptography. In this exemplary sequence, the variable data may contain the public key of a public/private key pair created by and known only by the authorized OS level user agent. The key may be stored in a structure as specified by either of the following two GUIDS from the UEFI specification: EFI_CERT_RSA2048_GUID or EFI_CERT_X509_GUID. The first structure allows the bare public key to be stored, while the second structure allows an X.509 certificate to be stored. The GUID is immediately followed by the public key data in the associated format.

The authenticated special firmware variable service call sequence begins when an authorized agent wants to open a session to the firmware, and calls GetVariable to retrieve a random session ID (step 302). The call is made to the GetVariable interface exposed by the variable service module 160 of the UEFI-compliant firmware 150 (step 304). Once the special GUID is noticed (step 305), the call is provided special handling, within which processing the session ID is encrypted in a process generally known as signing performed by firmware using the SystemManagementKey public key. The signed session ID is returned to caller. (step 306).

Figure 4:
FIG. 4 depicts an exemplary authenticated data layout.

The management application running in the operating system decrypts the response using its secret private key and thereby retrieves the session ID from the returned data using (step 310). The authorized agent may then send a system management command to the firmware by signing the SetVariable data, including timestamp and session ID, using the same private key used to retrieve the session ID. In one embodiment, the agent may sign some but less than all of the command, timestamp, session ID or other data with the key. In an embodiment, timestamps during a session may only move forward. In one embodiment, the session ID 402 may be located at the beginning of the variable data 404, as shown in FIG. 4. The authorized agent may then call SetVariable including the signed command in a parameter field (step 312). The SetVariable call is received (step 314) and if the firmware variable services identify the special GUID (step 314), the call is assigned special handling. In the special handling, the command, session ID and timestamp are verified to determine if they were signed by the private key originally used to sign the SystemManagementKey variable. Among other methods, this can be implemented by signing the hash of the combined command, session ID and timestamp and then comparing it to the stored hash of the previous command, session id and timestamp. In any case, if the decrypted command and session ID validate, then the calling application is authorized to access system management functions. If the timestamp is not correct, the command may be ignored and a Security Violation error returned. If the verification is successful then the requested command is performed and a processing result is returned first to the normal variable service module 160 and then to the calling agent 112 (step 316). It should be noted that multiple authenticated calls can be made during a single session. In one embodiment, if there was an error returned for the special SetVariable call, the agent may make a similar special call to retrieve more detailed error information.

When the authorized agent wants to close the session to the firmware, it may call SetVariable with the Session ID signed with the SystemManagementKey private key (step 320). The SetVariable call is received (step 322) and if the Special GUID is identified (step 323) the call is assigned special handling by the firmware. The command, session ID and timestamp are verified to determine if they were signed by the SystemManagementKey private key, and if so, the session is closed (step 324). It will be appreciated that other system management or diagnostics functions are able to be performed in a similar fashion by embodiments of the present invention.

Although a particular sequence of decryption and encryption using public and private keys is described above, it should be appreciated that other sequences and the use of other types of keys, such as symmetric keys, are also within the scope of the present invention and the invention is not limited to the sequence and particular keys described in FIG. 3 and elsewhere herein.

The additional security provided by using public and private keys in the manner discussed with respect to FIG. 3 may help to protect against a number of different types of unauthorized alterations known as attacks. For example, the verifying of the firmware variable service call helps to protect against session attacks, replay of a session attack, Man-in-the-Middle attack, and an eavesdropping attack on GetVariable.

In another embodiment, information that was needed by the agent may be retrieved using a matching GetVariable call. Although there is no authentication of the GetVariable call, the data may be encrypted using a public key that was pre-shared. Then the agent, after making the GetVariable call, may decrypt the return data using the private half of the pre-shared key. Alternatively, the GetVariable call may be authenticated by appending the authorization data (signature) to the variable name. The signature may be created using the SystemManagementKey private key to sign the hash of the serialization of {variable name, timestamp}. The signature may be based on the EFI_CERT_RSA2048_SHA1_GUID type of the UEFI specification, and include 256 bytes (in hex format).

FIG. 5 depicts an exemplary alternative environment suitable for practicing an embodiment of the present invention employing a runtime UEFI driver. Similarly to FIG. 1 above, a computing device 500 includes an operating system 510 and a software agent 512 executing in the operating system environment. Computing device 500 may also include a plug-in module 514 for providing a translation between a platform-independent agent 512 and UEFI firmware 550 via the UEFI interface. However, rather than providing support for special firmware services within firmware variable service module 560 as was done in FIG. 1, instead, the support for special firmware services may be provided by means of runtime UEFI driver 520. The runtime UEFI driver 520 may be loaded from disk or network and need not be built into the platform. When the UEFI computing device 500 boots, the Runtime Driver 520 is loaded into memory on the computing device 500.

In this alternative embodiment, when the agent 512 or plug-in module 514 module requests special firmware services, the extended parameter (such as the special GUID in the VendorGuid parameter) is used in a variable services call to the runtime UEFI driver 520. In this embodiment, all SetVariable calls are examined by the loaded SetVariable driver. A variable services hook 522 in the runtime UEFI driver 520 identifies the extended parameter (e.g.: special GUID), and calls a special services module 524 to process the service call. The special services module 524 can provide services such as diagnostics and system management. If standard variable services are required, then the Variable Services Hook 522 instead passes the call onto the standard variable service module 560 in the firmware 550. Further, as described above, it is possible to utilize the Authenticated forms of GetVariable and SetVariable to allow only trusted callers to be able to access the special functions of the firmware. By having the runtime UEFI driver 520 take over the variable services calls provided by standard UEFI firmware, new functionality may be added to an existing computing device equipped with UEFI-compliant firmware, even after it has been shipped to a customer. It should be noted that the runtime UEFI driver 520 and UEFI firmware 550 may come from different companies.

In one embodiment, using authenticated variable constructs, a user can be authenticated and privileges can be assigned based on credentials. For example, access to certain hardware components in the computing device may be limited to a desired subset of administrators. The UEFI firmware definition permits authenticated variable content changes to be verified as being originated by a trusted source via the process of variable signature verification. This can be extended to verifying the source of special extended variable calls. The process of creating the signed variable calls is outside the scope of this document.

Portions or all of the embodiments of the present invention may be provided as one or more computer-readable programs or code embodied on or in one or more non-transitory mediums. The mediums may be, but are not limited to a hard disk, a compact disc, a digital versatile disc, ROM, PROM, EPROM, EEPROM, Flash memory, a RAM, or a magnetic tape. In general, the computer-readable programs or code may be implemented in any computing language.

Since certain changes may be made without departing from the scope of the present invention, it is intended that all matter contained in the above description or shown in the accompanying drawings be interpreted as illustrative and not in a literal sense. Practitioners of the art will realize that the sequence of steps and architectures depicted in the figures may be altered without departing from the scope of the present invention and that the illustrations contained herein are singular examples of a multitude of possible depictions of the present invention.

The foregoing description of example embodiments of the invention provides illustration and description, but is not intended to be exhaustive or to limit the invention to the precise form disclosed. Modifications and variations are possible in light of the above teachings or may be acquired from practice of the invention. For example, while a series of acts has been described, the order of the acts may be modified in other implementations consistent with the principles of the invention. Further, non-dependent acts may be performed in parallel.

I claim:

1. A method for improved management and diagnostics in a computing device equipped with Unified Extensible Firmware (UEFI)-compliant firmware, the method comprising:

receiving with the UEFI-compliant firmware from a software agent executing in an operating system environment, via a first extension to a standard UEFI-variable firmware interface, a first firmware service call requesting a session identifier (ID), the first firmware service call made with a first extended variable parameter, the first extended variable parameter being a first specified parameter used in the first firmware service call in place of a parameter of the first firmware service call that is defined in a UEFI specification;

identifying the first extended variable parameter in the first firmware service call;

triggering a redirection of handling of the first firmware service call to alternative firmware code based on the identification of the first extended variable parameter;

returning the session ID to the software agent, the session ID signed by a public key held in an authenticated variable, a corresponding private key protected by the operating system;

receiving, via a second extension to the standard UEFI-variable firmware interface, a second firmware service call from the software agent to the firmware, the second firmware service call made with a second extended variable parameter, the second extended variable parameter being a second specified parameter used in the second firmware service call in place of a parameter of the second firmware service call that is defined in the UEFI specification, the second firmware service call being a management or diagnostic command and including the session ID and a timestamp, the session ID retrieved using the private key, at least one of the management or diagnostic command, the timestamp and the session ID in the second firmware service call signed by the private key;

identifying the second extended variable parameter in the second firmware service call;

triggering a redirection of handling of the second firmware service call to alternative firmware code based on the identification of the second extended variable parameter;

validating that the at least one of the management or diagnostic command, timestamp and session ID are signed by the private key; and processing the management or diagnostic command following a successful validation.

2. The method of claim 1 wherein the authenticated variable is created during platform deployment.

3. The method of claim 1 wherein the first or second extended parameter includes a pre-specified GUID value.

4. The method of claim 1, further comprising:
receiving the first or second firmware service call with a UEFI variable service module provided by the UEFI-compliant firmware of the computing device and redirecting the first or second firmware service call for handling by another firmware module based on the identification of the first or second extended variable parameter.

5. The method of claim 1, further comprising:
receiving the first or second firmware service call with a runtime UEFI driver that hooks a call to a UEFI variable service and redirects the first or second firmware service call for handling based on the identified first or second extended variable parameter.

6. The method of claim 1 wherein the UEFI-defined firmware interface is one of GetVariable and SetVariable.

7. A non-transitory computer-readable medium holding instructions for improved management and diagnostics in a computing device equipped with Unified Extensible Firmware (UEFI)-compliant firmware, the instructions when executed causing the computing device to:

receive with the UEFI-compliant firmware from a software agent executing in an operating system environment, via a first extension to a standard UEFI-variable firmware interface, a first firmware service call requesting a session identifier (ID), the first firmware service call made with a first extended variable parameter, the first extended variable parameter being a first specified parameter used in the first firmware service call in place of a parameter of the first firmware service call that is defined in a UEFI specification;

identify the first extended variable parameter in the first firmware service call;

trigger a redirection of handling of the first firmware service call to alternative firmware code based on the identification of the first extended variable parameter;

return the session ID to the software agent, the session ID signed by a public key held in an authenticated variable, a corresponding private key protected by the operating system;

receive, via a second extension to the standard UEFI-variable firmware interface, a second firmware service call from the software agent to the firmware, the second firmware service call made with a second extended variable parameter, the second extended variable parameter being a second specified parameter used in the second firmware service call in place of a parameter of the second firmware service call that is defined in the UEFI specification, the second firmware service call being a management or diagnostic command and including the session ID and a timestamp, the session ID retrieved using the private key, at least one of the management or diagnostic command, the timestamp and the session ID in the second firmware service call signed by the private key;

identify the second extended variable parameter in the second firmware service call;

trigger a redirection of handling of the second firmware service call to alternative firmware code based on the identification of the second extended variable parameter;

validate that the at least one of the management or diagnostic command, timestamp and session ID are signed by the private key; and process the management or diagnostic command following a successful validation.

8. The non-transitory medium of claim 7 wherein the authenticated variable is created during platform deployment.

9. The non-transitory medium of claim 7 wherein the first or second extended parameter includes a pre-specified GUID value.

10. The non-transitory medium of claim 7 wherein the instructions when executed further cause the computing device to:
receive the first or second firmware service call with a UEFI variable service module provided by the UEFI-compliant firmware of the computing device and redirect the first or second firmware service call for handling by another firmware module based on the identification of the first or second extended variable parameter.

11. The non-transitory medium of claim 7 wherein the instructions when executed further cause the computing device to:
receive the first or second firmware service call with a runtime UEFI driver that hooks a call to a UEFI variable service and redirects the first or second firmware service call for handling based on the identified first or second extended variable parameter.

12. The non-transitory medium of claim 7 wherein the UEFI-defined variable firmware interface is one of GetVariable and SetVariable.

13. A computing device with improved management and diagnostic capability, the computing device equipped with Unified Extensible Firmware (UEFI)-compliant firmware, and further comprising:

read only memory (ROM) holding the UEFI-compliant firmware;

memory holding an operating system; and a processor configured to execute instructions causing the computing device to:

receive with the UEFI-compliant firmware from a software agent executing in an operating system environment, via a first extension to a standard UEFI-variable firmware interface, a first firmware service call requesting a session identifier (ID), the first firmware service call made with a first extended variable parameter, the first extended variable parameter being a first specified parameter used in the first firmware service call in place of a parameter of the first firmware service call that is defined in a UEFI specification;

identify the first extended variable parameter in the first firmware service call;

trigger a redirection of handling of the first firmware service call to alternative firmware code based on the identification of the first extended variable parameter;

return the session ID to the software agent, the session ID signed by a public key held in an authenticated variable, a corresponding private key protected by the operating system;

receive, via a second extension to the standard UEFI-variable firmware interface, a second firmware service call from the software agent to the firmware, the second firmware service call made with a second extended variable parameter, the second extended variable parameter being a second specified parameter used in the second firmware service call in place of a parameter of the second firmware service call that is defined in the UEFI specification, the second firmware service call being a management or diagnostic command and including the session ID and a timestamp, the session ID retrieved using the private key, at least one of the management or diagnostic command, the timestamp and the session ID in the second firmware service call signed by the private key;

identify the second extended variable parameter in the second firmware service call;

redirect the second firmware service call to alternative firmware code based on the identification of the second extended variable parameter;

validate that the at least one of the management or diagnostic command, timestamp and session ID are signed by the private key; and process the management or diagnostic command following a successful validation.

14. The computing device of claim 13, further comprising:

a runtime UEFI driver that hooks a call to a UEFI variable service and redirects the first or second firmware service call for handling based on the first or second extended variable parameter.

15. The computing device of claim 13 wherein the UEFI-defined variable firmware interface is one of GetVariable and SetVariable.

16. The computing device of claim 13 wherein the authenticated variable is created during platform deployment.

* * * * *